United States Patent
Dellacona

(10) Patent No.: US 7,804,275 B2
(45) Date of Patent: Sep. 28, 2010

(54) BATTERY POWER SUPPLY

(76) Inventor: Richard Dellacona, 17 Goleta Point Dr., Corona Del Mar, CA (US) 92625

( * ) Notice: Subject to any disclaimer, the term of this patent is extended or adjusted under 35 U.S.C. 154(b) by 546 days.

(21) Appl. No.: 11/890,189

(22) Filed: Aug. 2, 2007

(65) Prior Publication Data

US 2009/0033281 A1    Feb. 5, 2009

(51) Int. Cl.
*H02J 7/00*        (2006.01)
(52) U.S. Cl. ....................................... 320/116
(58) Field of Classification Search ............... 320/106, 320/107, 110, 111, 113, 115, 116, 128
See application file for complete search history.

(56) References Cited

U.S. PATENT DOCUMENTS

| | | | |
|---|---|---|---|
| 5,544,274 A * | 8/1996 | Walker et al. ............... 388/838 |
| 5,578,876 A | 11/1996 | Crampton | |
| 5,929,602 A * | 7/1999 | Suzuki ....................... 320/116 |
| 5,959,370 A | 9/1999 | Pardo | |
| 6,586,911 B1 * | 7/2003 | Smith et al. ................. 320/134 |
| 2004/0192407 A1* | 9/2004 | Formenti .................... 455/572 |
| 2008/0048611 A1* | 2/2008 | Miglioranza ............... 320/107 |

* cited by examiner

*Primary Examiner*—Edward Tso
*Assistant Examiner*—M'Baye Diao
(74) *Attorney, Agent, or Firm*—Gene Scott; Patent Law & Venture Group

(57) ABSTRACT

A battery power supply for use with an electronic device, such as a computer, uses a multi-cell battery, and a recharging circuit. Cells of the battery are serially interconnected to produce positive output voltages of 3.6, 4.8 and 12 volts DC and negative voltages of 4.8 and 12 volts DC. The power supply includes output terminals for delivering the DC voltages to power inlets of the device nominally rated at 12, 5 and 3.3 volts DC. The recharging circuit includes an AC voltage input terminal and outputs corresponding to the battery output terminals.

6 Claims, 1 Drawing Sheet

BATTERY POWER SUPPLY

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to power supplies for computers and other electronic devices, and more particularly to a DC power supply using rechargeable battery cells adapted for supporting input DC voltage requirements of microcomputers, personal computers and similar computer systems.

2. Description of Related Art including information disclosed under 37 CFR 1.97 and 1.98

The need for alternative and backup power sources to standard power grid AC power has increased greatly over the last several years. With the proliferation of computers, such alternative power sources have become especially important. Due to evolving technologies and the abundance of features now available in a single electronic device, newer computers, televisions and other electronic systems often require several different, voltages and currents to operate. For instance, motherboards in today's new generation of personal computers require positive and negative 12 volts DC, positive and negative 5 volts DC and positive 3.3 volts DC. At this time, such voltages are provided by the computer's power supply, which conventionally steps down an input AC voltage to AC voltages equivalent to those required by the motherboard using transformers, then converts the AC voltages to the required positive and negative DC voltages using rectifiers, and then regulates the DC voltages and currents through regulator circuits.

In many instances, such power supplies are generally useful for their intended purposes. However, almost every computer user, at some time or another, has experienced a loss of data due to power interruptions. Such power interruptions gave rise to the current generation of backup power sources, most commonly known as uninterruptible power supplies or UPS for short battery backup systems.

UPS systems draw their energy from batteries and inverter circuitry converts the batteries' DC output voltage to an AC voltage, which is then supplied to a standard computer power supply to replace the unavailable line AC voltage. However, significant energy is lost to heat during the DC to AC conversion and the subsequent AC to DC conversion in the computer's power supply, resulting in a total power conversion efficiency of approximately fifty percent, and it also introduces unwanted transients which require additional filtering circuitry. As a result of this loss of efficiency, UPS systems, typically, can only operate for between ten and thirty minutes. Consequently, UPS systems are only intended as a short-term power source to give the user sufficient time to save the applications in use and shut down the computer. Line AC power, when available, is still intended to be the primary power source for this type of electronic equipment, as well as being necessary to recharge the UPS batteries.

Various other types of backup power sources have been developed over the years. However, virtually all of these prior art devices operate on the same principle as UPS systems, that is, during the presence of AC line power, the regular electronic device AC to DC power supply provides DC power to the computer, and when AC line voltage is absent or low, AC power is provided to the regular computer AC to DC power supply by backup batteries and DC to AC converters. Thus, such other prior art devices include many of the same limitations and problems discussed with respect to UPS systems and, consequently, are only able to operate for short periods of time.

Portable laptop computer batteries are an example of another common alternative power source. Such portable computers have become a mainstay for businessmen and other professionals and provide DC power when AC line voltage is absent. However, laptop computer power supplies also have certain inherent limitations which limit the batteries to approximately two hours of continuous operation without recharging and which render them inadequate as an alternative power source for present computers and electronic devices. Specifically, laptop computer batteries fail to directly provide the differential DC voltages required. Laptop batteries, typically, only provide a single output voltage, which must be converted or stepped down by the computer's circuitry to power the computer's components.

If the principals applied to laptop computers and their power systems were utilized for current computers, excessive power would be dissipated as heat, thereby requiring fans to maintain the power supply and surrounding computer components at a safe operating temperature. For example, as stated above, motherboards in current personal computers require positive and negative 12 volts DC, positive and negative 5 volts DC and positive 3.3 volts DC. During normal operation, the positive 5 volt line draws as much as 7 amps continuous and up to 10 amps during startup. Thus, in converting or stepping down the positive 12 volts to positive 5 volts, 49 watts of power is dissipated as heat. Consequently a greater amount of power is wasted in power conversion than is used by the motherboard. Such a waste of power is not only inefficient, but creates excessive heat and stress on computer components, thereby shortening their useful life.

Moreover, laptop computer batteries, like UPS systems, are intended to be only short-term backup power sources, and not replacements for AC power. Normal AC power, when available, is still intended to be the primary power source for laptop computers and is necessary to recharge its batteries.

Another prior art backup device which operates on similar principals to the laptop computer is shown in U.S. Pat. No. 5,578,876, which discloses a computer power system comprising an AC to DC power supply for providing DC power to the computer during the presence of AC line power and a backup power supply for providing DC power from batteries directly to the DC operated components, bypassing the AC to DC power supply, when AC line voltage is absent or low.

Although improving over the previously described prior art devices by eliminating DC to AC conversion circuitry, this device still does not eliminate the loss of power and heat associated with regulator circuitry in typical power supplies and, consequently, includes some of the inherent design deficiencies of prior art power supplies. For instance, in providing DC power from batteries directly to the DC operated components, regulator circuitry is used to convert or step down the voltage from positive and negative 12 volts to the required lower positive and negative voltages. As discussed above, about fifty percent of the stored energy is dissipated as heat when providing positive 5 volts.

Applicant has discovered that a battery DC power supply which provides differential DC voltages directly from the batteries to the electronic equipment and which may serve as a primary power source in place of AC power supplies, as disclosed herein, eliminates or reduces many of the problems inherent in prior art power supplies.

The prior art, as evidenced by its generally consistent approach in power supply designs, teaches away from such a power supply and fails to recognize these problems. Consequently, there is no suggestion or motivation for one of ordinary skill in the art to modify any of the prior art devices in the manner disclosed by applicant's invention or in any other manner which might address these problems.

U.S. Pat. No. 5,959,370 to Pardo, Sep. 28, 1999, teaches a differential voltage battery DC power supply. However, the '370 reference fails to teach an arrangement of battery cells that is able to provide operating voltages without regulators and filtering circuitry. It also fails to teach recharging operation dependent on battery voltage fluctuation due to loss of charge and the use of the DC battery operation cut-in when mains current degrades or fails.

Accordingly, there is a need for a battery power supply capable of operation during the presence and also during the absence of AC line voltage, which reduces the inefficiencies, power loss and heat dissipation associated with the prior art power supply devices and which provides voltages directly from the batteries to the electronic device during the presence and absence of AC line voltage, thereby extending the operating time of the backup battery and the useful life of the electronic equipment's components. The use of a battery arrangement to provide the several voltages required by a computer system without the need for regulators and filtering networks clearly distinguishes over the prior art, most particularly, the Pardo references which teaches away from the present apparatus by the use of voltage regulators and transient filters. The present invention is particularly suited to overcome the problems described above.

BRIEF SUMMARY OF THE INVENTION

The present invention is directed towards a new and improved battery power supply comprising an arrangement of batteries, a integrated with a battery charger. The circuit includes a positive voltage battery group and a negative voltage battery group. The groups use plural battery cells are arranged to provide voltages that meet the requirements of +12 and −12, +5 and −5 and +3.3 volts DC with the lower voltages taken as taps. In the positive group the cells are tapped to take off 3.3 volts DC and 5 volts DC. In the negative group the cells are tapped to take off 5 volts DC. The charger is powered by mains and provides +12 and −12 voltage outputs which are tied into the +12 and −12 battery outputs respectively. Therefore, the batteries includes output terminals corresponding to positive 12 volts DC, positive 5 volts DC, positive 3.3 bolts DC, negative 5 volts DC and negative 12 volts DC. In an extension of the above described power supply, a current sensor is made a part of the circuit and when mains current is degraded or lost, the sensor is able to connect the battery supply to the electronic device. In this approach, the battery supply acts as a backup power supply providing current directly to the mother board of the computer, for instance.

It is an object of the present invention to provide a new and improved power supply which has all the advantages of the prior art devices and none of the disadvantages.

It is another object of the present invention to provide a battery power supply.

It is also an object of the present invention to provide such a device which is capable of operation during the presence and absence of AC line voltage.

It is a further object of the present invention to provide such a device which does not convert battery DC voltage to AC voltage for use with an electronic equipment's AC power supply during the absence of AC line voltage.

It is yet another object of the present invention to provide such a device which may be utilized as an electronic device's primary power source.

It is a yet a further object of the present invention to provide such a device which is capable of operation with the logic circuitry necessary to communicate with newer computer motherboards and other control circuits in computers and other advanced technology electronic devices.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which.

DETAILED DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
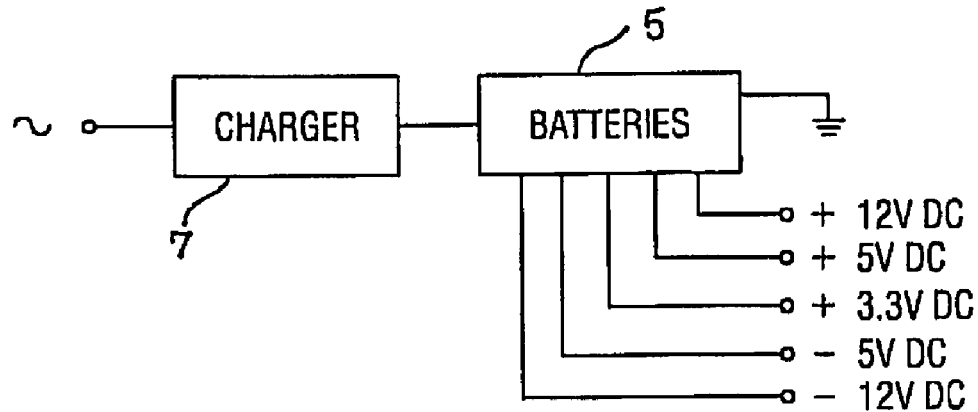
FIG. 1 is a block diagram of the battery power supply of the present invention showing the nominal voltages required by a circuit to be powered by the power supply.

The present invention is a battery power supply apparatus for operating an electronic device 3 such as a personal computer. A general diagram of the present invention is shown in FIG. 1 where we see a battery pack 5 having an arrangement of batteries which will be described in detail, plus a battery charger 7. Nominal DC voltages required for the operation of contemporary personal computers and other computer circuits are +12, +5, +3.3, −5 and −12 volts. It is noted that these voltages are nominal and therefore such circuits will operate satisfactorily when applied voltages vary from these values by up to plus and minus 20 percent. It is well known that production line final test parameters permit commercially available batteries to vary from its stated nominal value by about ten percent. Also, the internal resistance of a given DC cell may change significantly over its useful life further affecting its output value. Battery pack 5 produces the above five voltages within a typical circuit's acceptable range of variability. The cells that make up batteries 10, 20, 30, 40 and 50 are preferably either nickel metal hydride or lithium ion types, however, other rechargeable battery types may be used as well.

Figure 2:
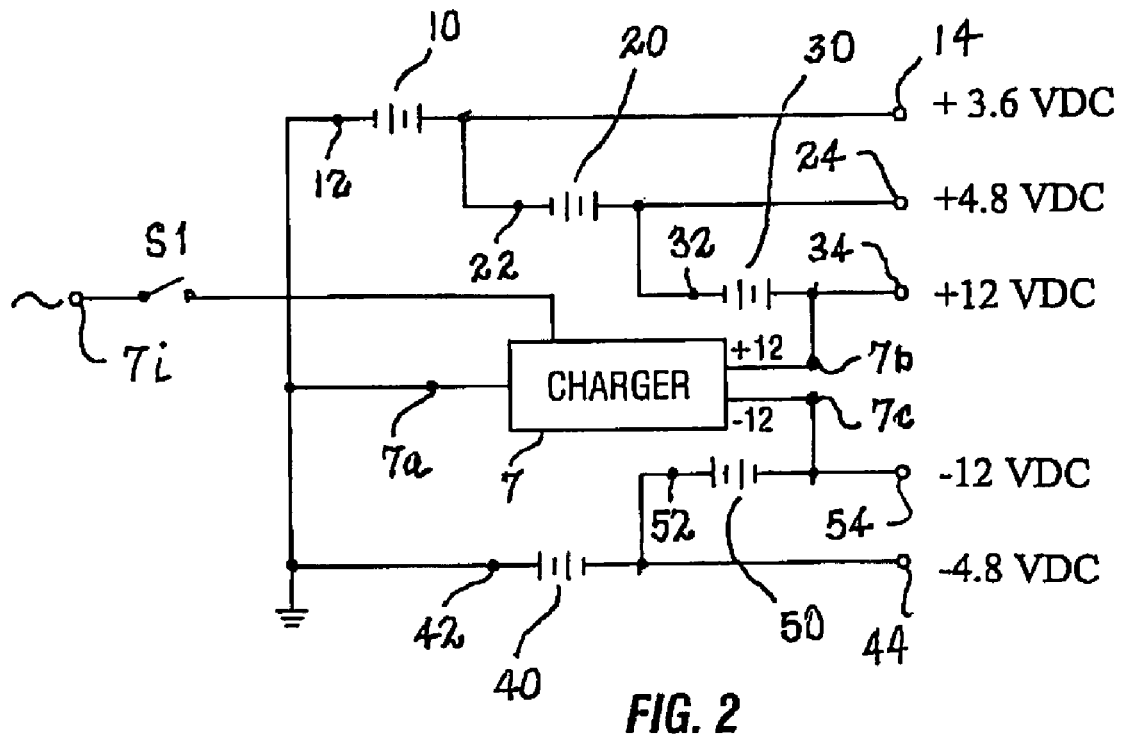
FIG. 2 is a schematic diagram showing a preferred arrangement of the batteries used in the apparatus and showing the actual nominal voltages produced by the power supply.

Further details of the invention are shown in FIG. 2, where we see a first rechargeable battery 10 having a first input terminal 12 held at ground potential and a first output terminal 14 at +3.6 volts DC. Also, a second rechargeable battery 20 has a second input terminal 22 common with the first output terminal 14 and a second output terminal 24 at +4.8 volts DC. Further, a third rechargeable battery 30 has a third input terminal 32 common with the second output terminal 24 and a third output terminal 34 at +12 volts DC. A fourth rechargeable battery 40 has a fourth input terminal 42 in common with the first input terminal 12 at ground potential, and a fourth output terminal 44 which is at −4.8 volts DC. Finally, a fifth rechargeable battery 50 has a fifth input terminal 52 common with the fourth output terminal 44 and a fifth output terminal 54 at −12 volts DC. The use of the word "terminal" herein may be taken to mean: a physical electrode, a point in a circuit, a conductive path or an electrical conductor.

Also shown in FIG. 2 is battery charger 7 which is enabled for recharging the rechargeable batteries of the circuit shown, and has an input terminal 7i adapted for receiving an AC voltage from mains. The term "mains" refers typically to the 110/220 volts, 60/50 hertz AC voltage available from a public utility, but also refers to other available AC utility voltages public or private. Also, in certain circumstances, charger 7 may be provided a DC voltage. Preferably a power switch S1 is preferably provided in the mains line as shown.

Charger 7 provides three terminals including: a first charger terminal 7a pinned to ground potential, a second charger output terminal 7b providing a +12 volts DC charging current, the second charger output terminal 7b interconnected for current flow with the third output terminal 34 of the third battery 30. A third charger output terminal 7c provides a −12 volts DC charging current, the third charger output terminal 7c interconnected for current flow with the fifth output terminal 54 of the fifth battery 50. These details are shown in FIG. 2.

Charger 7 may, for only one example, be taken from the circuit of Molicel, Inc. found in the Encyclopedia of Electronic Circuits, TAB books, McGraw-Hill, Volume 2, page 67. In this circuit charging is accomplished with a constant current of 60 mA. This circuit is hereby incorporated herein by reference.

The present invention apparatus is interconnected with a personal computer, PDA, cell phone or other electronic device (not shown) at any one or more of the output terminals 14, 24, 34, 44 and 54 to deliver operating currents at their respective voltages from the first 10, second 20, third 30, fourth 40 and fifth 50 rechargeable batteries respectively. As can be seen in the circuit of FIG. 2, when output voltages at any one of the output terminals begins to fall off, that is, drop below its rated voltage level by a chosen magnitude, the voltage level at charger output terminal 7b and, or, 7c being in common with terminals 34 and 54 respectively, will tend to drop also. Sensing voltage-level changes may be accomplished in many ways well known in the prior art. A simplified voltage-level sensor may be used as shown in, The Encyclopedia of Electronic Circuits, vol. 3, page 770. However, when this occurs, charger 7 supplies a charging current at +12 volts DC to terminal 7b and, or, at −12 volts DC to terminal 7c which reestablishes operating level output voltages at the output terminals 14, 24, 34, 44, and 54, and at the same time charges up all of the batteries 10, 20, 30, 40, and 50. When the voltage at the output terminals 34 and 54 are maintained above their respective 12 volts by batteries 30 and 50 respectively, charger 7 cuts off its charging current. In this manner, batteries 10, 20, 30, 40, and 50 are able to provide operating voltages to the connected electronic device, while charger 7 functions as a backup apparatus to maintain the batteries at full charge as long as mains current, denoted in FIG. 2 by the symbol (~), is available to charger 7.

Referring again to FIG. 2, in the preferred embodiment, battery 10 comprises three 1.2 volt DC cells connected in series to produce a nominal output of +3.6 volts DC at output terminal 14 and functional as 3.3 volts DC. Battery 20 comprises one further cell of 1.2 volts to produce an output of +4.8 volts DC at output terminal 24 and functional as +5 volts DC. Six further cells of 1.2 volts each are then joined in series to produce an output of +12 volts DC, at output terminal 34.

Likewise, four 1.2 volt DC cells are connected in series as battery 40 to produce an output of −4.8 volts DC at output terminal 44 and functional as −5 volts. Battery 50 comprises 6 further cells of 1.2 volts DC each to produce an output of −12 volts DC at output terminal 54. Preferably, 1.2 volt, lithium ion cells or nickel metal hydride cells are used.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A battery power supply apparatus for providing operating voltages to an electronic device, the apparatus comprising:
   a first rechargeable battery having a first input terminal held at ground potential and a first output terminal held nominally at +3.3 volts DC;
   a second rechargeable battery having a second input terminal common with the first output terminal and a second output terminal held nominally at +5 volts DC;
   a third rechargeable battery having a third input terminal common with the second output terminal and a third output terminal held nominally at +12 volts DC;
   a fourth rechargeable battery having a fourth input terminal common with the first input terminal and a fourth output terminal held nominally at −5 volts DC;
   a fifth rechargeable battery having a fifth input terminal common with the fourth output terminal and a fifth output terminal held nominally at −12 volts DC; and
   a battery charger having an input terminal adapted for receiving an AC voltage and three charger terminals including a first charger terminal pinned to ground potential, a second charger output terminal providing a +12 volts DC charging current, the second charger output terminal interconnected for current flow with the third output terminal of the third battery; and a third charger output terminal providing a −12 volts DC charging current, the third charger output terminal interconnected for current flow with the fifth output terminal of the fifth battery;
   whereby, with the apparatus interconnected with the electronic device, the first, second, third, fourth and fifth rechargeable batteries provide output voltages for operation of the electronic device, and the battery charger continuously maintains charge in the rechargeable batteries.

2. The apparatus of claim 1 wherein:
   a) the first rechargeable battery comprises three 1.2 volt DC cells connected in series to produce an output of +3.6 volts DC;
   b) the second rechargeable battery comprises one 1.2 volt DC cell connected in series with the first rechargeable battery to produce an output of +4.8 volts DC;
   c) the third rechargeable battery comprises six 1.2 volt DC cells connected in series and also in series with the second rechargeable battery to produce an output of +12 volts DC;
   d) the fourth rechargeable battery comprises four 1.2 volt DC cells connected in series to produce an output of −4.8 volts DC; and
   e) the fifth rechargeable battery comprises six 1.2 volt DC cells connected in series and also in series with the fourth rechargeable battery to produce an output or −12 volts DC.

3. The apparatus of claim 2 wherein the batteries are made up of at least one of lithium ion cells and nickel metal hydride cells.

4. A battery power supply apparatus For providing operating voltages to an electronic device, the apparatus comprising:
   a first rechargeable battery having a first input terminal held at ground potential and a first output terminal held nominally at +3.3 volts DC;
   a second rechargeable battery having a second input terminal common with the first output terminal and a second output terminal held nominally at +5 volts DC;
   a third rechargeable battery having a third input terminal common with the second output terminal and a third output terminal held nominally at +12 volts DC; and
   a battery charger having an input terminal adapted for receiving an AC voltage and two charger terminals including a first charger terminal pinned to ground potential, and a second charger output terminal providing a +12 volts DC charging current, the second charger output terminal interconnected for current flow with the third output terminal of the third battery;
   whereby, with the apparatus interconnected with the electronic device, the first, second, and third rechargeable batteries provide output voltages for operation of the electronic device, and the battery charger continuously maintains charge in the rechargeable batteries.

5. The apparatus of claim 4 wherein:
   a) the first rechargeable battery comprises three 1.2 volt DC cells connected in series to produce an output of +3.6 volts DC;
   b) the second rechargeable battery comprises one 1.2 volt DC cell connected in series with the first rechargeable battery to produce an output of +4.8 volts DC; and
   c) the third rechargeable battery comprises six 1.2 volt DC cells connected in series and also in series with the second rechargeable battery to produce an output of +12 volts DC.

6. The apparatus of claim 5 wherein the batteries are made up of at least one of lithium ion cells and nickel metal hydride cells.

* * * * *